(12) United States Patent
Cui et al.

(10) Patent No.: US 12,184,165 B2
(45) Date of Patent: Dec. 31, 2024

(54) POWER FACTOR CORRECTION CIRCUIT

(71) Applicant: Magnachip Mixed-Signal, Ltd., Cheongju-si (KR)

(72) Inventors: Zhiyuan Cui, Cheongju-si (KR); Jonghyun Kim, Suwon-si (KR); Byungki Kim, Seongnam-si (KR); Tianzhao Gao, Cheongju-si (KR); Chunyan Zhang, Cheongju-si (KR); Quan Liu, Cheongju-si (KR)

(73) Assignee: Magnachip Mixed-Signal, Ltd., Cheongju-si (KR)

( * ) Notice: Subject to any disclaimer, the term of this patent is extended or adjusted under 35 U.S.C. 154(b) by 233 days.

(21) Appl. No.: 17/973,838

(22) Filed: Oct. 26, 2022

(65) Prior Publication Data
US 2023/0299664 A1    Sep. 21, 2023

(30) Foreign Application Priority Data
Mar. 18, 2022    (KR) .................. 10-2022-0034100

(51) Int. Cl.
*H02M 1/42*    (2007.01)
(52) U.S. Cl.
CPC ............................. *H02M 1/4208* (2013.01)

(58) Field of Classification Search
CPC ................................................ H02M 1/4208
See application file for complete search history.

(56) References Cited

U.S. PATENT DOCUMENTS

| | | |
|---|---|---|
| 8,513,926 B2 | 8/2013 | Park et al. |
| 9,692,404 B2 | 6/2017 | Cui et al. |
| 2016/0323947 A1* | 11/2016 | Seki ................ H05B 45/10 |
| 2020/0144906 A1* | 5/2020 | Endo ............... H02M 3/33507 |
| 2020/0403497 A1* | 12/2020 | Scappatura ......... H02M 1/4225 |
| 2021/0013806 A1* | 1/2021 | Yaguchi ............. H02M 3/156 |

* cited by examiner

*Primary Examiner* — Rafael O Leon De Domenech
(74) *Attorney, Agent, or Firm* — NSIP Law

(57) ABSTRACT

A power factor correction circuit includes an inductor configured to receive an input voltage and supply an output voltage; a power switch connected to the inductor and configured to control an input current flowing through the inductor; and a switch controller configured to receive a feedback voltage including information on the output voltage and an auxiliary voltage including information on a voltage of the inductor and control an on/off operation of the power switch. The switch controller is further configured to operate in a first mode when the feedback voltage is less than a reference voltage, and operate in a second mode when the feedback voltage is greater than the reference voltage.

18 Claims, 3 Drawing Sheets

POWER FACTOR CORRECTION CIRCUIT

CROSS-REFERENCE TO RELATED APPLICATIONS

The present application claims the benefit under 35 U.S.C. 119(a) of Korean Patent Application No. 10-2022-0034100, filed Mar. 18, 2022, the entire disclosure of which is incorporated herein by reference for all purposes.

BACKGROUND

1. Field

The following description relates to a power factor correction circuit that may prevent an overshoot of an output voltage.

2. Description of the Related Art

A converter receives an input power source and supplies a power source required for a load. A voltage of the input power source is a type of an alternating current (AC) power source, and a current supplied to the load is a type of a direct current (DC) power source. Here, since a current flowing through the load is similar to the current of the input power source, a phase difference between the voltage and the current of the input power source is generated and therefore a reactive power loss occurs. The reactive power loss is a cause of decreasing a power factor.

The power factor indicates the effectiveness of power transfer. The power factor is represented by dividing an actually delivered real power by an apparent power. When both the voltage and the current are sinusoidal, the power factor is changed according to a phase difference between the voltage and the current, and the power factor is improved as the phase difference is reduced. Therefore, power factor correction generally refers to a process of correcting a shape of an input current to be a sinusoidal shape and reducing a phase difference between the voltage and the current.

In order to improve the power factor, the phase difference between the voltage and the current of the input power source should be reduced. Since the current of the input power source is affected by a current flowing through the load, if the shape of a current supplied to the load has a frequency and phase similar to the voltage of the input power source, the phase difference between the current of the input power source and the voltage of the input power source can be reduced. A power factor correction value increases when there is no phase difference between the voltage and the current, and a power factor correction value decreases as the phase difference increases.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power factor correction circuit includes an inductor configured to receive an input voltage and supply an output voltage; a power switch connected to the inductor and configured to control an input current flowing through the inductor; and a switch controller configured to receive a feedback voltage including information on the output voltage and an auxiliary voltage including information on a voltage of the inductor and control an on/off operation of the power switch, wherein the switch controller is further configured to operate in a first mode when the feedback voltage is less than a reference voltage, and operate in a second mode when the feedback voltage is greater than the reference voltage.

In another general aspect, a power factor correction circuit includes an inductor configured to receive an input voltage and supply an output voltage; a power switch connected to the inductor and configured to control an input current flowing through the inductor; and a switch controller configured to receive a feedback voltage including information on the output voltage and an auxiliary voltage including information on a voltage of the inductor and control an on/off operation of the power switch, wherein the switch controller is further configured to generate a gate control signal which varies an on-time of the power switch according to a level of the feedback voltage during an initial operation period.

The switch controller is configured to increase the on-time of the power switch as the feedback voltage approaches a target voltage of the output voltage, in a first mode, and maintain the on-time of the power switch constant, in a second mode.

The switch controller includes an error amplifier configured to amplify a difference between the feedback voltage and the target voltage and output an error amplifying signal; a ramp signal generator configured to generate a ramp signal having a different slope according to the feedback voltage and the target voltage of the output voltage while the power switch is turned on; and a pulse width modulation (PWM) controller configured to generate a gate control signal for controlling a switching operation of the power switch by using the auxiliary voltage, the error amplifying signal, and the ramp signal.

The ramp signal generator, in the first mode, is configured to generate the ramp signal by supplying currents supplied by a first current source and a second current source to a capacitive element, and in the second mode, generate the ramp signal by supplying a current supplied by the second current source to the capacitive element, The PWM controller includes a second comparator configured to generate a second comparison signal by comparing the error amplifying signal and the ramp signal; a zero-crossing detector configured to compare the auxiliary voltage with a predetermined zero-crossing reference voltage and generate a zero-crossing detection signal for turning on the power switch according to a comparison result; and a second latch configured to receive the second comparison signal as a reset input and the zero-crossing detection signal as a set input, and output the gate control signal.

The ramp signal generator further includes a second switch connected in parallel with the capacitive element, wherein the second switch is controlled based on an inverted signal of the gate control signal output by the PWM controller.

A magnitude of a current supplied by the first current source is proportional to a difference value between the feedback voltage and the target voltage.

The ramp signal generator further includes a first switch configured to connect the first current source and the capacitive element, wherein the first switch is controlled based on the feedback voltage and the reference voltage.

The ramp signal generator further includes a first comparator configured to generate a first comparison signal by comparing the feedback voltage and the reference voltage;

and a first latch configured to receive the first comparison signal as a reset input and an initialization pulse as a set input, and output a first control signal for controlling the first switch.

The power factor correction circuit further includes another inductor coupled to the inductor, and the auxiliary voltage is a voltage of the another inductor with a predetermined turns ratio with respect to the inductor.

Advantageous Effects

The switch controller according to one or more embodiments of the present disclosure is configured to compare a feedback voltage with a reference voltage, and operate in a first mode when the feedback voltage is less than the reference voltage, and operate in a second mode when the feedback voltage is greater than the reference voltage.

The switch controller is configured to increase an on-timing of a power switch as the feedback voltage approaches a target voltage, in the first mode.

The switch controller is configured to maintain the on-timing of the power switch constant, in the second mode.

Through this circuit, the power factor correction circuit according to one or more embodiments may prevent an overshoot of an output voltage by maintaining the on-timing of the power switch constant after the output voltage sufficiently rises.

In addition, the power factor correction circuit according to one or more embodiments may provide improved system stability based on monitoring of the output voltage, by controlling the on-timing of the power switch to increase as the feedback voltage approaches a target voltage during an initial operation period (when operating in the first mode). Other features and aspects will be apparent from the following detailed description, the drawings and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
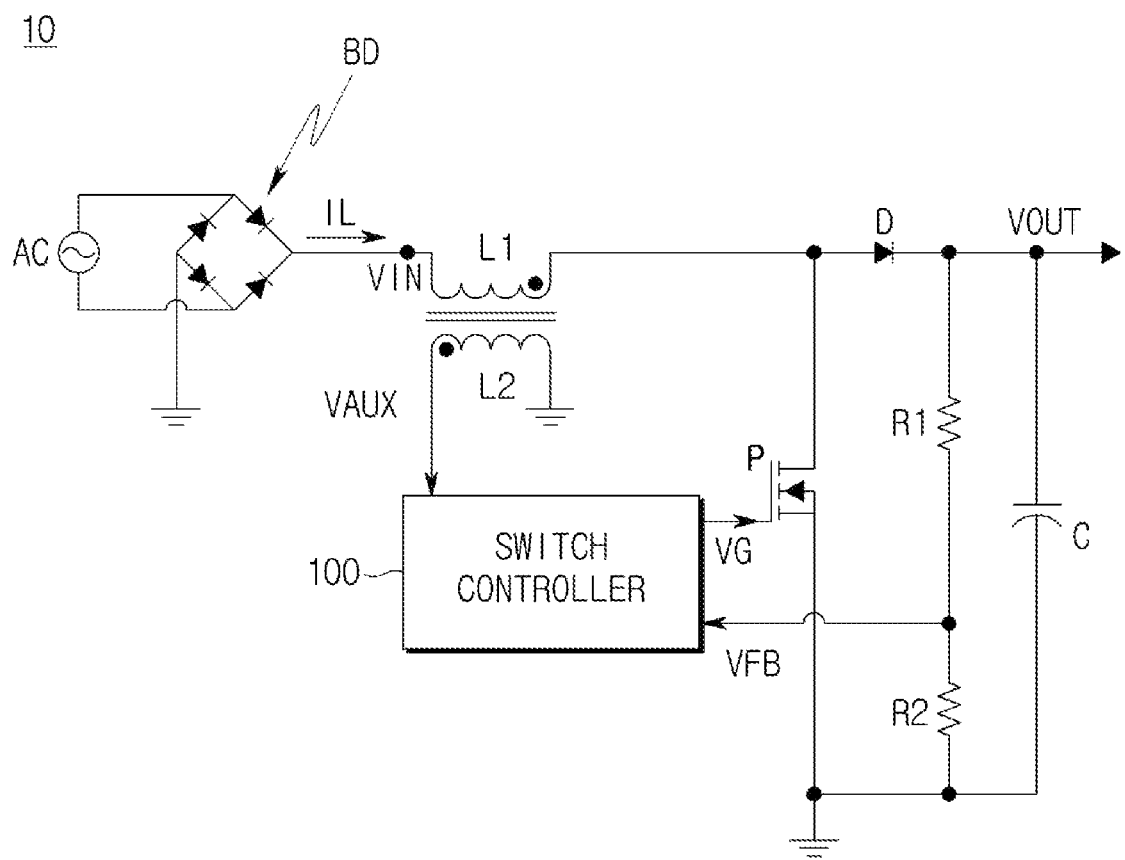
FIG. 1 illustrates a blocking diagram of a power factor correction circuit according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates a block diagram of a power factor correction circuit according to one or more embodiments of the present disclosure.

A power factor correction circuit 10 includes a switch controller 100, a power switch P, a bridge diode BD, a diode D, a capacitor C, a first inductor L1, a second inductor L2, and dividing resistors R1 and R2.

The bridge diode BD may include four diodes, and full-wave rectifies input alternating current (AC) power source to generate an input voltage VIN. An output end of the bridge diode BD is connected to one end of the first inductor L1. The one end of the first inductor L1 is provided with the input voltage VIN, and the other end of the first inductor L1 is connected to an anode electrode of the diode D. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

A drain electrode of the power switch P is connected to the anode electrode of the diode D and the other end of the inductor L1.

The switch controller 100 may control an on/off operation of the power switch P according to a gate control signal VG. The switch controller 100 may determine a turn-off time of the power switch P using a feedback voltage VFB. The feedback voltage VFB is a voltage in which an output voltage VOUT is divided according to a resistance ratio (R2/(R1+R2)) of the dividing resistors R1 and R2. In addition, the switch controller 100 may determine a turn-on time of the power switch P using an auxiliary voltage VAUX of the second inductor L2.

The dividing resistors R1 and R2 may constitute a voltage divider and provide the feedback voltage VFB to the switch controller 100. Since the feedback voltage VFB is a value in which the output voltage VOUT is divided according to the resistance ratio (R2/(R1+R2)) of the dividing resistors R1 and R2, it can be considered to include information on the output voltage VOUT.

The first inductor L1 may receive the input voltage VIN and generate the output voltage VOUT. An inductor current IL flowing through the first inductor L1 may be controlled by a switching operation of the power switch P.

The second inductor L2 is coupled to the first inductor L1 with a predetermined turns ratio (n). When the power switch P is in a state of being turned on, the auxiliary voltage VAUX of the second inductor L2 is a value obtained by multiplying the turns ratio (n) and the input voltage VIN. When the power switch P is in a state of being turned off, the auxiliary voltage VAUX is a value obtained by multiplying a voltage difference (VIN-VOUT), which is obtained by subtracting the output voltage VOUT from the input voltage VIN, by the turns ratio (n).

When the power switch P is turned on, the diode D is blocked, and the inductor current IL flows through the power switch P. During a period in which the power switch P is turned on, the first inductor L1 stores energy while the inductor current IL increases.

When the power switch P is turned off and the diode D is connected, the inductor current IL flows to a load (not shown) connected to an output end of the power factor correction circuit 10 to charge the capacitor C. During a period in which the power switch P is turned off, the inductor current IL flows through the diode D, and the energy stored in the first inductor L1 is transmitted to the output end of the power factor correction circuit 10.

Figure 2:
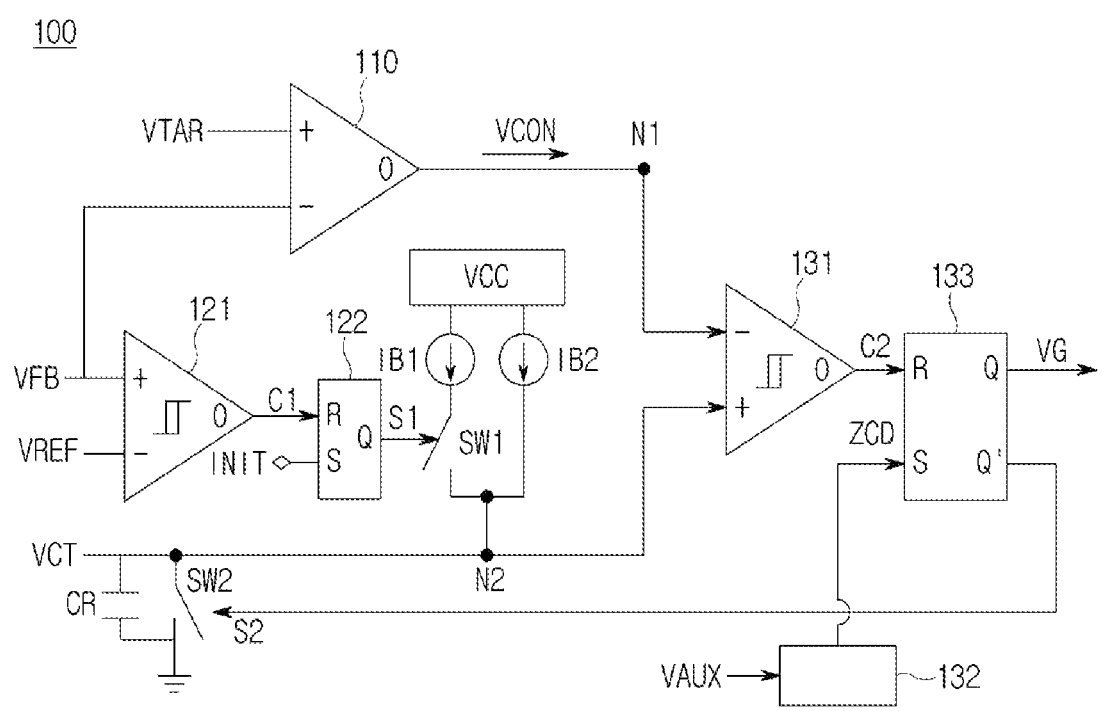
FIG. 2 illustrates a block diagram of a switch controller according to one or more embodiments of the present disclosure.
Figure 3:
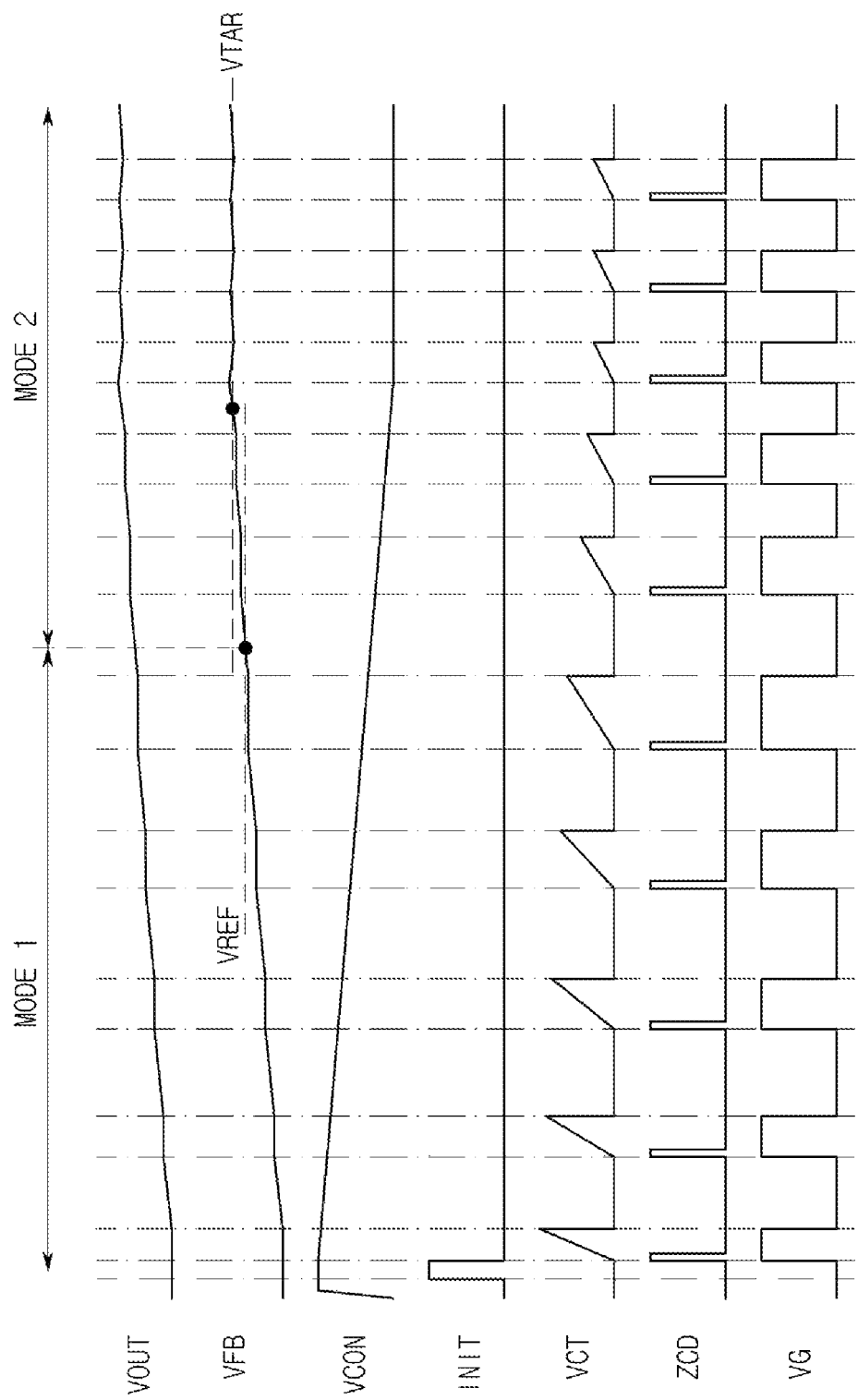
FIG. 3 illustrates a timing diagram of input and output signals of the switch controller according to one or more embodiments of the present disclosure.

FIG. 2 illustrates a block diagram of a switch controller according to one or more embodiments of the present disclosure. FIG. 3 illustrates a timing diagram of input and output signals of the switch controller according to one or more embodiments of the present disclosure.

The switch controller 100 may include an error amplifier 110, a ramp signal generator, and a PWM controller, and may operate in a first mode and a second mode. The first mode corresponds to a section in which the feedback voltage VFB is less than a reference voltage VREF, and the second mode corresponds to a section in which the feedback voltage VFB is greater than the reference voltage VREF.

The error amplifier 110 may monitor information of the output voltage VOUT. A non-inverting terminal (+) of the error amplifier 110 receives a predetermined target voltage VTAR. An inverting terminal (−) of the error amplifier 110 receives the feedback voltage VFB. An output terminal O of the error amplifier 110 is connected to a first node N1. The first node N1 is connected to an inverting terminal (−) of a second comparator 131 to be described later. The error amplifier 110 may amplify a difference between the predetermined target voltage VTAR and the feedback voltage VFB and output an error amplifying signal VCON to the first node N1. The error amplifying signal VCON is input to the inverting terminal (−) of the second comparator 131 of the PWM controller. In addition, the error amplifying signal VCON may be used to control a current value of a first current source IB1.

The ramp signal generator may generate a ramp signal VCT having a different slope according to the feedback voltage VFB and the target voltage VTAR during the period in which the power switch P is turned on.

The ramp signal generator may include a first comparator 121, a first latch 122, a first current source IB1, a second current source IB2, a first switch SW1, and a second switch SW2.

The ramp signal generator may generate the ramp signal VCT by charging a current supplied to the capacitive element CR. The ramp signal generator may adjust a slope of the ramp signal VCT by adjusting a magnitude of current supplied to the capacitive element CR. The slope of the ramp signal VCT affects a turn-on time of the power switch P. Specifically, as the slope of the ramp signal VCT increases, the turn-on time of the power switch P decreases.

The ramp signal generator may adjust the magnitude of current supplied to the capacitive element CR through the control of the first switch SW1. Specifically, the ramp signal generator may turn on the first switch SW1 in the first mode and generate the ramp signal VCT based on the currents supplied by the first current source IB1 and the second current source IB2. That is, since the amount of the current supplied to the capacitive element CR increases as the sum IB1+IB2 in the first mode, the slope of the ramp signal VCT increases.

In addition, the ramp signal generator may generate the ramp signal VCT based on the second current source IB2 by turning off the first switch SW1, in the second mode.

One end of the first current source IB1 is connected to one end of the first switch SW1, and the other end of the first switch SW1 is connected to a second node N2. The second node N2 is connected to the other end of the first switch SW1, one end of the second switch SW2, and a non-inverting terminal (+) of the second comparator 131. The other end of the second switch SW2 is connected to ground (GROUND).

The power source VCC supplies a voltage required for each of the first current source IB1 and the second current source IB2 to generate a current. A switching operation of the first switch SW1 may be controlled by a first control signal S1.

A magnitude of current supplied by the first current source IB1 is controlled by the error amplifying signal VCON. That is, the magnitude of current supplied by the first current source IB1 is proportional to a difference value between the feedback voltage VFB and the target voltage VTAR. Specifically, the magnitude of the first current source IB1 may be a value obtained by multiplying the error amplifying signal VCON by a predetermined coefficient gm (IB1=gm*VCON). Here, the "gm" may be an open circuit voltage gain of the above-described error amplifier 110. Accordingly, in a state in which the first switch SW1 is turned on, the slope of the ramp signal VCT may be adjusted based on the magnitude of the error amplifying signal VCON.

A magnitude of current of the second current source IB2 may comprise a DC current source having a fixed value. In the second mode in which the first switch SW1 is turned off, since the ramp signal generator generates the ramp signal VCT based only on the second current source IB2, the slope of the ramp signal may have a fixed value.

The first comparator 121 and the first latch 122 may generate the first control signal S1 and control the switching operation of the first switch SW1.

A non-inverting terminal (+) of the first comparator 121 receives the feedback voltage VFB. An inverting terminal (−) of the first comparator 121 receives a predetermined reference voltage VREF. An output terminal O of the first comparator 121 is connected to a reset terminal R of the first latch 122 and outputs a first comparison signal C1. The first latch 122 outputs the first control signal S1 which controls the switching operation of the first switch SW1. The reset terminal R of the first latch 122 receives the first comparison signal C1 from the output terminal O of the first comparator 121. A set terminal S of the first latch 122 is connected an initialization terminal to receive an initialization pulse INIT.

Based on the connection configuration as above, the first comparator 121 and the first latch 122 may turn on the first switch SW1 in the first mode in which the feedback voltage VFB is less than the reference voltage VREF and turn off the first switch SW1 in the second mode in which the feedback voltage VFB is greater than the reference voltage VREF.

A switching operation of the second switch SW2 is controlled by a second control signal S2. A second latch 133 may generate the second control signal S2 through an inverted output terminal Q' and control the switching operation of the second switch SW2. Accordingly, the second switch SW2 is turned on when the gate control signal VG which is output from the second latch 133 has a low value. When the second switch SW2 is turned on, since the second node N2 is connected to ground, the ramp signal VCT has a voltage of 0V. That is, the ramp signal VCT has a value of 0 during a period in which the power switch P is turned off (the gate control signal VG is low), and has a waveform having a predetermined slope during a period in which the power switch P is turned on (the gate control signal VG is high).

The PWM controller may generate a gate control signal VG for controlling the switching operation of the power switch P using the auxiliary voltage VAUX, the ramp signal VCT, and the error amplifying signal VCON. The PWM controller includes the second comparator 131, a zero-crossing detector 132, and the second latch 133.

The second comparator 131 may compare the ramp signal VCT and the error amplifying signal VCON, and output a second comparison signal C2 to a reset terminal R of the second latch 133. The non-inverting terminal (+) of the second comparator 131 receives the ramp signal VCT, and the inverting terminal (−) thereof receives the error amplifying signal VCON. An output terminal O of the second comparator 131 is connected to the reset terminal R of the second latch 133. The second comparator 131 may generate a second comparison signal C2 of a high level when the ramp signal VCT is equal to or greater than the error amplifying signal VCON, and generate a second comparison signal C2 of a low level when the ramp signal VCT is less than the error amplifying signal VCON. Accordingly, when the ramp signal VCT reaches the error amplifying signal VCON, a second comparison signal C2 of a high level is output at that time.

The zero-crossing detector 132 may compare the auxiliary voltage VAUX with a predetermined zero-crossing reference voltage (not shown), and generate a zero-crossing detection signal ZCD for turning on the power switch according to a comparison result. The zero-crossing detection signal ZCD generated by the zero-crossing detector 132 is input to a set terminal of the second latch 133. The zero-crossing detector 132 may be implemented as a hysteresis comparator. The zero-crossing reference voltage may be 0V. The zero-crossing detector 132 is in synchronization with an on time in which the auxiliary voltage VAUX, which has decreased after the power switch P was turned off, becomes less than or equal to the zero-crossing reference voltage, and generates the zero-crossing detection signal ZCD having a high-level pulse.

The second latch 133 may output the gate control signal VG through an output terminal Q, and output the second control signal S2 through the inverted output terminal Q'. The second latch 133 may output the gate control signal VG of a low-level when a low-level signal is input to the set terminal S and a high-level signal is input to the reset terminal R. Further, when a high-level signal is input to the set terminal S and a low-level signal is input to the reset terminal R, the second latch 133 may output the gate control signal VG of a high-level.

As described above, the switch controller 100 according to one or more embodiments of the present disclosure may compare the feedback voltage VFB with the reference voltage VREF, and operate in the first mode when the feedback voltage VFB is less than the reference voltage VREF, and operate in the second mode when the feedback voltage VFB is greater than the reference voltage VREF.

The switch controller 100 may increase an on-time of the power switch P as the feedback voltage VFB approaches the target voltage VTAR, in the first mode.

The switch controller 100 may maintain the on-time of the power switch P constant, in the second mode.

Through this circuit, the power factor correction circuit 10 according to one or more embodiments may prevent an overshoot of the output voltage as the on-time of the power switch P is maintained constant after the time in which the feedback voltage VFB and the target voltage VTAR meet, i.e., the time in which the output voltage sufficiently rises to the level of the target voltage VTAR.

In addition, the power factor correction circuit 10 according to one or more embodiments may provide improved system stability based on monitoring of the output voltage VOUT, by controlling the on-time of the power switch P to increase as the feedback voltage VFB approaches the target voltage VTAR during an initial operation period (when operating in the first mode).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power factor correction circuit comprising:
an inductor configured to receive an input voltage and supply an output voltage;
a power switch connected to the inductor and configured to control an input current flowing through the inductor; and
a switch controller configured to receive a feedback voltage including information on the output voltage and an auxiliary voltage including information on a voltage of the inductor and control an on/off operation of the power switch,
wherein the switch controller is further configured to:
operate in a first mode when the feedback voltage is less than a reference voltage,
operate in a second mode when the feedback voltage is greater than the reference voltage,
increase an on-time of the power switch as the feedback voltage approaches a target voltage of the output voltage in the first mode, and
maintain the on-time of the power switch constant in the second mode.

2. The power factor correction circuit of claim 1, wherein the switch controller comprises:
an error amplifier configured to amplify a difference between the feedback voltage and the target voltage and output an error amplifying signal;
a ramp signal generator configured to generate a ramp signal having a different slope according to the feedback voltage and the target voltage of the output voltage while the power switch is turned on; and
a pulse width modulation (PWM) controller configured to generate a gate control signal for controlling a switching operation of the power switch by using the auxiliary voltage, the error amplifying signal, and the ramp signal.

3. The power factor correction circuit of claim 2, wherein the ramp signal generator is configured to:
generate the ramp signal by supplying currents supplied by a first current source and a second current source to a capacitive element, in the first mode, and
generate the ramp signal by supplying a current supplied by the second current source to the capacitive element, in the second mode.

4. The power factor correction circuit of claim 2, wherein the PWM controller comprises:
a second comparator configured to generate a second comparison signal by comparing the error amplifying signal and the ramp signal;
a zero-crossing detector configured to compare the auxiliary voltage with a predetermined zero-crossing reference voltage and generate a zero-crossing detection signal for turning on the power switch according to a comparison result; and
a second latch configured to receive the second comparison signal as a reset input and the zero-crossing detection signal as a set input and output the gate control signal.

5. The power factor correction circuit of claim 3, wherein the ramp signal generator further comprises a second switch connected in parallel with the capacitive element, and
wherein the second switch is controlled based on an inverted signal of the gate control signal output by the PWM controller.

6. The power factor correction circuit of claim 3, wherein a magnitude of a current supplied by the first current source is proportional to a difference value between the feedback voltage and the target voltage.

7. The power factor correction circuit of claim 3, wherein the ramp signal generator further comprises a first switch configured to connect the first current source and the capacitive element, and
wherein the first switch is controlled based on the feedback voltage and the reference voltage.

8. The power factor correction circuit of claim 7, wherein the ramp signal generator further comprises:
a first comparator configured to generate a first comparison signal by comparing the feedback voltage and the reference voltage; and
a first latch configured to receive the first comparison signal as a reset input and an initialization pulse as a set input and output a first control signal for controlling the first switch.

9. The power factor correction circuit of claim 1, further comprising another inductor coupled to the inductor,
wherein the auxiliary voltage is a voltage of the another inductor with a predetermined turns ratio with respect to the inductor.

10. A power factor correction circuit comprising:
an inductor configured to receive an input voltage and supply an output voltage;
a power switch connected to the inductor and configured to control an input current flowing through the inductor; and
a switch controller configured to receive a feedback voltage including information on the output voltage and an auxiliary voltage including information on a voltage of the inductor and control an on/off operation of the power switch,
wherein the switch controller is further configured to:
generate a gate control signal which varies an on-time of the power switch according to a level of the feedback voltage during an initial operation period,
increase the on-time of the power switch as the feedback voltage approaches a target voltage of the output voltage in a first mode, and
maintain the on-time of the power switch constant in a second mode.

11. The power factor correction circuit of claim 10, wherein the switch controller comprises:

an error amplifier configured to amplify a difference between the feedback voltage and the target voltage and output an error amplifying signal;

a ramp signal generator configured to generate a ramp signal having a different slope according to the feedback voltage and the target voltage of the output voltage while the power switch is turned on; and a pulse width modulation (PWM) controller configured to generate a gate control signal for controlling a switching operation of the power switch by using the auxiliary voltage, the error amplifying signal, and the ramp signal.

12. The power factor correction circuit of claim 11, wherein the ramp signal generator is configured to:

generate the ramp signal by supplying currents supplied by a first current source and a second current source to a capacitive element, in the first mode, and generate the ramp signal by supplying a current supplied by the second current source to the capacitive element, in the second mode.

13. The power factor correction circuit of claim 12, wherein the PWM controller comprises:

a second comparator configured to generate a second comparison signal by comparing the error amplifying signal and the ramp signal;

a zero-crossing detector configured to compare the auxiliary voltage with a predetermined zero-crossing reference voltage and generate a zero-crossing detection signal for turning on the power switch according to a comparison result; and a second latch configured to receive the second comparison signal as a reset input and the zero-crossing detection signal as a set input, and output the gate control signal.

14. The power factor correction circuit of claim 12, wherein the ramp signal generator further comprises a second switch connected in parallel with the capacitive element, and wherein the second switch is controlled based on an inverted signal of the gate control signal output by the PWM controller.

15. The power factor correction circuit of claim 12, wherein a magnitude of a current supplied by the first current source is proportional to a difference value between the feedback voltage and the target voltage.

16. The power factor correction circuit of claim 13, wherein the ramp signal generator further comprises a first switch configured to connect the first current source and the capacitive element, and wherein the first switch is controlled based on the feedback voltage and the reference voltage.

17. The power factor correction circuit of claim 16, wherein the ramp signal generator further comprises:

a first comparator configured to generate a first comparison signal by comparing the feedback voltage and the reference voltage, and a first latch configured to receive the first comparison signal as a reset input and an initialization pulse as a set input, and output a first control signal for controlling the first switch.

18. The power factor correction circuit of claim 10, further comprising another inductor coupled to the inductor, wherein the auxiliary voltage is a voltage of the another inductor with a predetermined turns ratio with respect to the inductor.

* * * * *